United States Patent [19]

Nosenchuck et al.

[11] Patent Number: 5,320,309
[45] Date of Patent: Jun. 14, 1994

[54] ELECTROMAGNETIC DEVICE AND METHOD FOR BOUNDARY LAYER CONTROL

[75] Inventors: Daniel M. Nosenchuck, Mercerville; Garry L. Brown, Princeton, both of N.J.

[73] Assignee: British Technology Group USA, Inc., Gulph Mills, Pa.

[21] Appl. No.: 986,257

[22] Filed: Dec. 7, 1992

Related U.S. Application Data

[63] Continuation-in-part of Ser. No. 904,570, Jun. 26, 1992, abandoned.

[51] Int. Cl.$^5$ ............................................. B64C 21/00
[52] U.S. Cl. ................................... 244/205; 244/204; 244/198
[58] Field of Search ................. 244/204, 205, 198, 130, 244/201

[56] References Cited

U.S. PATENT DOCUMENTS

| | | | |
|---|---|---|---|
| 2,763,125 | 9/1956 | Kadosch et al. | 60/230 |
| 2,946,541 | 7/1960 | Boyd | 244/205 |
| 3,162,398 | 12/1964 | Clauser et al. | 244/205 |
| 3,224,375 | 12/1965 | Hoff | 244/130 |
| 3,360,220 | 12/1967 | Meyer | 244/205 |
| 3,390,693 | 7/1968 | Ziemer et al. | 137/807 |
| 3,494,369 | 2/1970 | Inoue | 137/13 |
| 3,662,554 | 5/1972 | De Broqueville | 244/130 |
| 3,851,195 | 11/1974 | Zauderer | 310/11 |
| 3,854,061 | 12/1974 | Rosa | 310/11 |
| 3,880,192 | 4/1975 | Denizov et al. | 137/827 |
| 4,171,707 | 10/1979 | Branover | 137/13 |
| 4,216,800 | 8/1980 | Garnier et al. | 137/807 |
| 5,040,560 | 8/1991 | Glezer et al. | 137/13 |
| 5,052,491 | 10/1991 | Harms et al. | 166/304 |

FOREIGN PATENT DOCUMENTS

| | | |
|---|---|---|
| 1956760 | 5/1971 | Fed. Rep. of Germany . |
| 1031925 | 6/1953 | France ............... 244/205 |
| 273456 | 1/1969 | U.S.S.R. . |

OTHER PUBLICATIONS

Nosenchuck, D. M., and Brown, G. L., "The Direct Control of Wall-Shear Stress in a Turbulent Boundary Layer in Single and Multiple Domains," MAE Report T1954 (Princeton Univ.), Aug. 31, 1992.

Nosenchuck, D. M., and Brown, G. L., "Discrete Spatial Control of Wall Shear Stress in a Turbulent Boundary Laser," *Proceedings of Int.l Conf. on Near-Wall Turb. Flows*, (Ariz. State Univ.), 1993.

Watanabe, T. "Magnetohydrodynamic Stability of a Boundary Layer Flow with Suction or Injection Along a Flat Plate," ZAMM 67 (1987) pp. 27-30.

A. Tsinober, "MHD Flow Drag Reduction," *Viscous Drag Reduction in Boundary Layers*, American Institute of Aeronautics and Astronautics, Inc., 1990.

*Primary Examiner*—Michael S. Huppert
*Assistant Examiner*—Anne E. Bidwell
*Attorney, Agent, or Firm*—Fitzpatrick, Cella, Harper & Scinto

[57] ABSTRACT

The boundary layer of a fluid travelling in a mean-flow direction relative to a surface of a wall of a body is controlled by generating in a near-wall region of the flow a magnetic field $\overline{B}$ having flux lines parallel to the surface of the wall and an electric current density $\overline{J}$ traversing the magnetic flux lines in the fluid. An electrolyte or other conductivity-enhancing material is introduced into the flow to provide an electrical conductivity gradient in the near-wall region. The magnetic field $\overline{B}$ and the electric current density $\overline{J}$ create in the fluid a force $\overline{J} \times \overline{B}$ having a component normal to the surface of the wall that because of the increased conductivity gradient near the surface can stabilize or destabilize flow in the boundary layer. Numerous aspects of the fluid flow and its interaction with the body can thus be controlled. As examples, shear stress in the fluid at the wall can be decreased, with a corresponding reduction in viscous drag, the characteristics of the acoustic and pressure fields in the fluid surrounding the body can be controlled to reduce noise and fatigue, and boundary layer separation can be inhibited or induced.

25 Claims, 10 Drawing Sheets

ELECTROMAGNETIC DEVICE AND METHOD FOR BOUNDARY LAYER CONTROL

This application is a Continuation-in-Part of U.S. application Ser. No. 07/904,570 filed Jun. 6, 1992, now abandoned.

BACKGROUND OF THE INVENTION

1. Field of the Invention

The present invention relates to a device and method for magnetically controlling the flow of a fluid along a wall and, more particularly, to magnetic control of the boundary layer on aerodynamic bodies (such as wings, rotors and flaps) and hydrodynamic bodies (such as submarine sails, bow-planes, stern appendages and propellers).

2. Description of the Prior Art

A viscous fluid, and a body completely immersed in the fluid, form a boundary layer at the body's surface when the fluid and the body move relative to each other. That is, the layer of fluid in contact with the body is essentially at rest, while in an area removed from the body, the fluid is moving at its free-stream velocity. The region between the body and that area is known as a boundary layer.

The boundary layer is laminar at low Reynolds' number. ($Re = UL/\nu$, where U is a characteristic velocity, such as the free-stream velocity, L is a characteristic dimension of the body, such as the length of a wing chord or boat hull, and $\nu$ is the kinematic viscosity of the fluid.) When the Reynolds' number increases, the boundary layer becomes unstable and turbulent. In some cases, it can "separate" from the body.

Figure 1A:
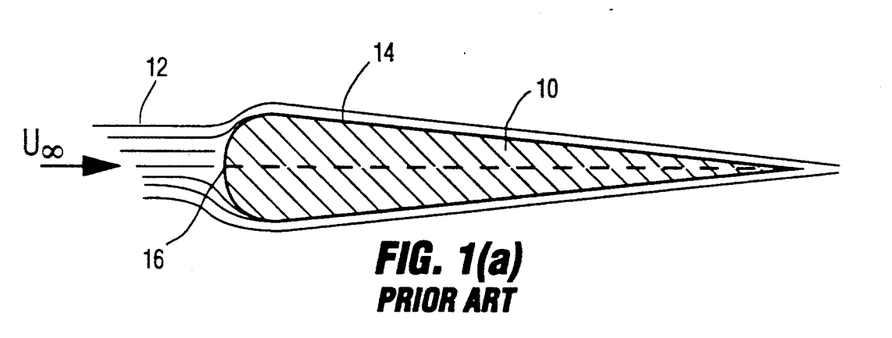
FIGS. 1(a) and 1(b) depict fluid flow around an airfoil.
Figure 1B:
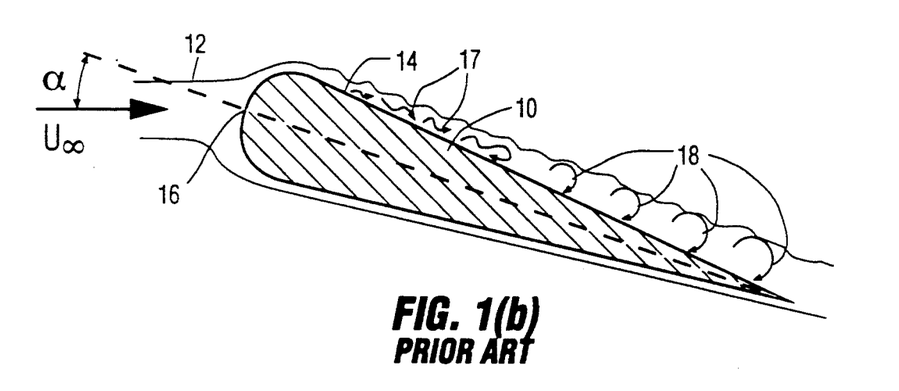

FIGS. 1(a) and 1(b) illustrate flow over an airfoil. It will be appreciated that the same principles apply whether the fluid is a liquid or a gas and regardless of the shape of the body.

When the airfoil 10 is operating at a small angle of attack $\alpha$, as shown in FIG. 1(a), the fluid stream 12, with a free-stream velocity $U_{2s}$, flows smoothly over the upper surface 14 of the airfoil. The downward deflection of the fluid stream by the airfoil causes an equal and opposite upward lift force to act on the airfoil.

As the angle of attack $\alpha$ increases, as shown in FIG. 1(b), the boundary layer may become turbulent, as indicated by the irregular flow 17. (For purposes of illustration, the boundary layer is depicted in FIG. 1 as much thicker than it is in actuality.) At very high angles of attack the boundary layer may separate from the airfoil, which then stalls. In addition to the loss of lift caused by boundary layer separation, eddies and turbulence 18 develop in the boundary layer.

Instability leading to boundary layer turbulence at a body's surface has several implications.

First, boundary layer turbulence increases viscous drag, which may create the need for additional propulsive force to be applied to the airfoil or other body, which in turn requires more fuel to be expended to maintain the speed of the airplane, submarine, propeller blade, etc., to which the airfoil is attached. Moreover, if the flow separates completely, additional pressure drag is created.

In addition, a turbulent boundary layer exhibits large velocity and pressure fluctuations, which induce noise. Noise can be a significant problem in many environments, one example being submarine control surfaces and propeller screw blades. Pressure fluctuations associated with boundary layer separation can cause vibration, which in turn causes fatigue, which can be a serious problem particularly in metal aircraft parts.

Various approaches have been taken to stabilize boundary layer flow and delay boundary layer separation. One of these approaches includes optimizing the geometry of the airfoil to achieve a maximum possible angle of attack. However, an optimum airfoil shape still only allows the airfoil to operate at limited angles of attack.

Approaches for controlling the boundary layer along a surface of an object have also included providing suction or injection of air through fine slits in the airfoil surface to supply or withdraw energy from the boundary layer. However, in addition to the burden of providing fine slits over the surface of the object, such approaches require extensive tubing networks to supply the force necessary for suction or injection. Accordingly, this approach adds considerably to the overall weight and complexity of the object, which is generally inconsistent with the design objectives of most applications.

The prior art has not yet achieved the capability to provide all of these types of boundary layer control in a very efficient, practical and easily implemented fashion.

SUMMARY OF THE INVENTION

It is an object of the present invention to control the flow over a body for at least the following purposes:

1. Control of shear stress in the fluid in the boundary layer to reduce shear stress in the fluid at the wall and reduce viscous drag on the body.

2. Control of boundary layer separation to decrease or increase the resulting form (pressure) drag on the body, which also can be used to create forces and moments on the body and thereby provide directional control.

3. Control of the characteristics of the acoustic field in the fluid surrounding the body.

4. Control of heat transfer between the body and the fluid.

5. Control of turbulent fluid mixing in the boundary layer.

6. Control of the characteristics of the pressure field in the fluid surrounding the body and the resulting coupled forces.

In accordance with one general aspect of the present invention, an apparatus for controlling a boundary layer in a flow of a fluid having a predetermined electrical conductivity and moving relative to a surface comprises conductivity altering means for providing an electrical conductivity gradient in a near-wall region of the flow proximate to the surface, magnetic field generating means for generating in the near-wall region of the flow a magnetic field $\overline{B}(x,y,z,t)$ having flux lines with a predetermined orientation with respect to the direction of relative movement of the fluid and the surface, and electric current generating means for generating in the near-wall region of the flow an electric current density $\overline{J}(x,y,z,t)$ traversing the magnetic flux lines, wherein the magnetic field $\overline{B}$ and electric current density $\overline{J}$ create in the near-wall region of the flow a force $\overline{L}(x,y,z,t) = \overline{J} \times \overline{B}$ having a component normal to the surface.

In accordance with another general aspect of the invention, a method for controlling a boundary layer in a flow of a fluid moving relative to a surface and having an electrical conductivity gradient in a near-wall region of the flow proximate to the surface comprises the steps of determining a magnetic field $\bar{B}(x,y,z,t)$ to be provided in the near-wall region of the flow such that flux lines of the magnetic field have a predetermined orientation with respect to the direction of relative movement of the fluid and the surface, determining an electric current density $\bar{J}(x,y,z,t)$ to be provided in the near-wall region of the flow such that the electric current traverses the magnetic flux lines in the fluid, and determining a position at which the magnetic field $\bar{B}$ and the electric current density $\bar{J}$ are to be provided with respect to the surface and the mean-flow direction of the fluid such that the magnetic field and the electric current create in the fluid a force $\bar{L}(x,y,z,t) = \bar{J} \times \bar{B}$ having a component normal to the surface.

In accordance with a more specific aspect of the present invention, the force $\bar{J} \times \bar{B}$ is normal to the surface of the wall and is in a direction toward the wall or away from the wall.

In accordance with yet another general aspect of the present invention, an apparatus is provided for controlling a boundary layer of an electrically conductive fluid moving relative to a surface, the apparatus comprising magnetic field generating means for generating in the fluid a magnetic field $\bar{B}(x,y,z,t)$ having flux lines entering and leaving the surface and electric current generating means for generating in the fluid an electric current density $\bar{J}(x,y,z,t)$ traversing the magnetic flux lines in the fluid. The magnetic field $\bar{B}$ and the electric current density $\bar{J}$ create in the fluid a force $\bar{L}(x,y,z,t) = \bar{J} \times \bar{B}$ having a component normal to the surface.

In accordance with still another general aspect of the invention, a method for controlling a boundary layer of an electrically conductive fluid travelling along a surface comprises the steps of determining a magnetic field $\bar{B}(x,y,z,t)$ to be provided in the fluid such that flux lines of the magnetic field enter and leave the surface, determining an electric current density $\bar{J}(x,y,z,t)$ to be provided in the fluid such that the electric current traverses the magnetic flux lines in the fluid, and determining a position at which the magnetic field $\bar{B}$ and the electric current density $\bar{J}$ are to be provided with respect to the surface and the mean-flow direction of the fluid such that the magnetic field $\bar{B}$ and the electric current density $\bar{J}$ create in the fluid a force $\bar{L}(x,y,z,t) = \bar{J} \times \bar{B}$ having a component normal to the surface.

BRIEF DESCRIPTION OF THE DRAWINGS

The various aspects of the present invention can be best understood by reference to the detailed description of preferred embodiments set forth below taken with the drawings, in which.

DETAILED DESCRIPTION OF PREFERRED EMBODIMENTS

Figure 2A:
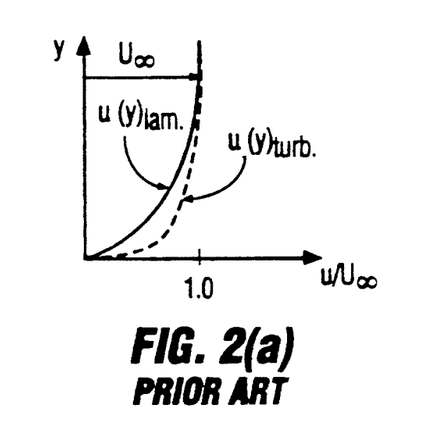
FIGS. 2(a) to 2(c) depict boundary layer flow conditions that illustrate principles utilized in the present invention.
Figure 2B:
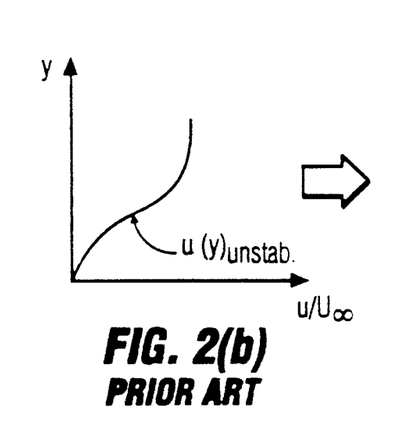
Figure 2C:
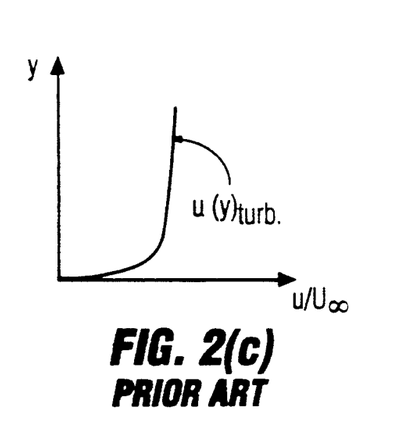

FIGS. 2(a) to 2(c) illustrate generally accepted principles regarding flow conditions in a boundary layer.

FIG. 2 plots the velocity in a fluid at a wall (y=0) of a flat plate and in the region of the boundary layer. At y=0, the velocity u is generally considered to be zero. The velocity increases as y increases, and approaches the free-stream velocity $U_{28}$. The velocity u in the mean-flow direction can thus be expressed as u(y).

The average wall shear stress $\tau_W$ in the mean-flow direction is expressed by the following relation:

$$\tau_w = \mu \frac{du}{dy}\bigg|_{wall} \quad (1)$$

where $\mu$ is the viscosity of the fluid.

In turn, the wall shear stress is related to viscous drag as follows:

$$D_{viscous} = \int_{wall} \tau_w dA \quad (2)$$

where dA is an elemental area of the wall.

Equations (1) and (2) show that $\tau_W$ and $D_{viscous}$ increase as du/dy at the wall increases.

FIG. 2(a) illustrates u(y) for a laminar boundary layer, shown as a solid line, and u(y) for a turbulent boundary layer, shown in a dotted line, for the same external conditions. It will be appreciated that du/dy at the wall is lower for a laminar boundary than for a turbulent boundary layer at the same location on the wall. Accordingly, viscous drag can be reduced if the flow in the boundary layer can be maintained laminar However, instability in the flow in the boundary layer can cause the flow to become turbulent. An illustration of this phenomena is shown in FIGS. 2(b) and 2(c).

FIG. 2(b) illustrates the velocity profile in an unstable boundary layer. The velocity of the fluid immediately adjacent the wall begins to slow down and can even approach zero. This is often an unstable condition, which leads to the replacement of the low velocity fluid near the wall by the higher energy (higher velocity) fluid in the free-stream. The boundary layer thus established is generally turbulent, as illustrated in FIG. 2(c). Accordingly, du/dy at the wall is higher than it would have been if the transition to turbulent flow had not occurred.

Turbulence in the boundary layer has implications beyond the resulting increase in viscous drag. For one thing, the turbulent flow in the boundary layer creates noise because velocity fluctuations inherent in turbulent flow produce pressure fluctuations that tend to propagate into the free-stream flow.

The present invention can stabilize the flow in the boundary layer and thus reduce viscous drag and noise. The present invention can also serve the purposes listed above, in ways described in more detail in the course of the following discussion.

Figure 3A:
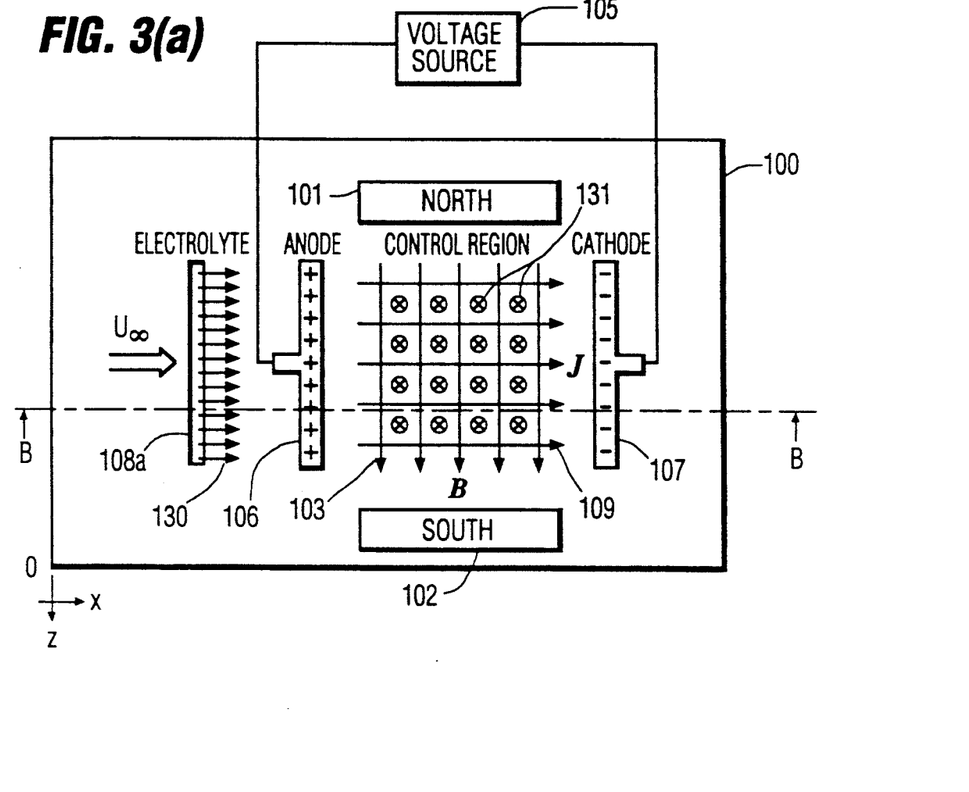
FIG. 3(a) is a planform view of a magnetic boundary layer control device in accordance with the present invention and FIG. 3(b) is a cross-section along line B—B of FIG. 3(a).
Figure 3B:
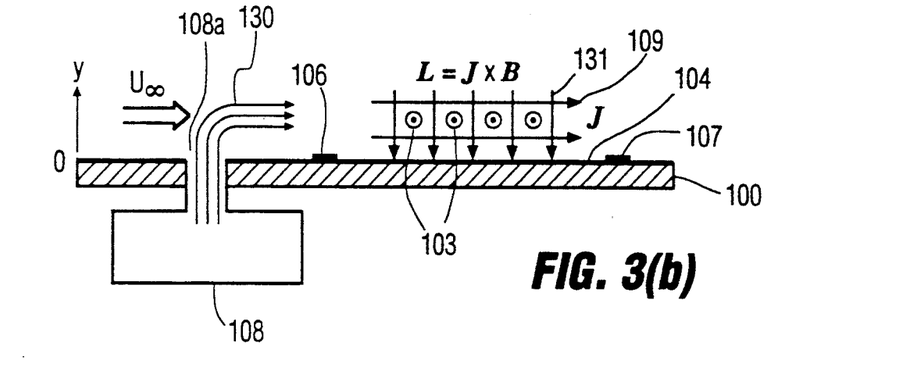

FIG. 3(a) is a planform view of a device illustrating the present invention. A wall or flat plate 100, simulating a wing or a control surface, is provided with a magnet having a North pole 101 and a South pole 102 for generating a magnetic field $\overline{B}$ with flux lines 103. The flux lines 103 enter and exit the surface 104 of the wall, thus being oriented parallel to the wall surface 104 and normal to the free-stream fluid flow direction x. (The coordinate system used herein is shown in FIGS. 3(a) and 3(b)).

The magnetic poles 101 and 102 shown in FIG. 3(a) are provided by a horseshoe magnet (not shown) beneath the plate 100 (that is, on the side opposite the surface 104), and the plate is a non-ferrous material that allows free passage of magnetic flux. An electromagnet may also be used.

However, the magnetic poles can be provided by any suitable structure. For example, the poles of one or more magnets can be placed flush with the surface 104 so as to form a part of the surface itself, and can even protrude from the surface. All such arrangements are within the scope of the present invention, which in one aspect provides that flux lines enter and exit the surface. For definitional purposes in describing that aspect of the present invention, "flux lines" are deemed to enter and exit the surface whether or not they are internal to the magnet (which would be the case if the magnetic poles protruded from the surface) or are part of the magnetic field external to the magnet.

A voltage source 105 attached across electrodes 106 and 107 generates an electric current density $\overline{J}$, represented by arrows 109, between the two electrodes. Of course, if the plate 100 is electrically conductive, the electrodes 106 and 107 are insulated from the plate.

To control the boundary layer using the present invention it is highly desirable that the fluid in the boundary layer have a certain degree of electrical conductivity $\sigma$ different from the conductivity of the rest of the fluid. In the device shown in FIGS. 3(a) and 3(b), an electrolyte 130 is added to the boundary layer by bleeding an electrolyte from a reservoir 108 through a slit 108a into the medium to increase the conductivity of a thin layer of the liquid adjacent to the wall.

A direction of the current flow through the conductive fluid is in the direction from an anode electrode 106 to a cathode electrode 107 such that the current density can be expressed as a vector $\overline{J}$ parallel to the mean flow direction x of the fluid medium. As depicted in FIG. 3(b), a Lorentz force $\overline{L}$, represented by arrows 131, resulting from the interposition of the electric current and magnetic field, is expressed as $\overline{J} \times \overline{B}$, the vector- or cross-product of $\overline{J}$ and $\overline{B}$ acting in a control region in a direction normal to and toward the wall 100.

Figure 4:
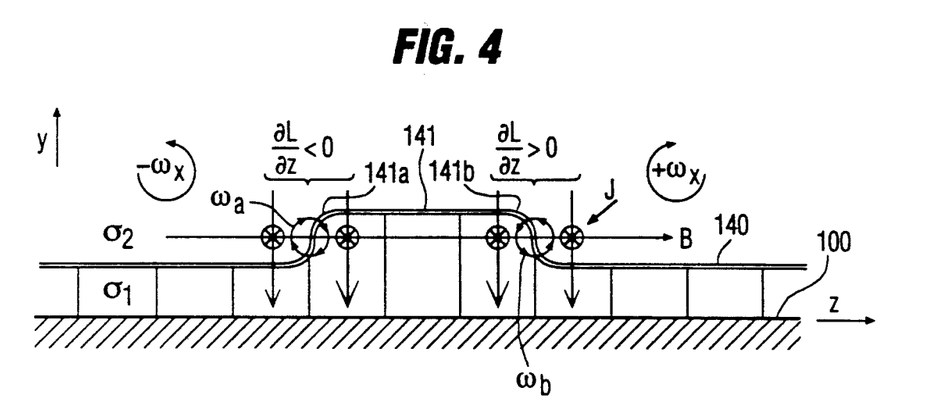
FIG. 4 depicts a section of the fluid flow shown in FIGS. 3(a) and 3(b)

The Lorentz force $\overline{L} = \overline{J} \times \overline{B}$ stabilizes the boundary layer by counteracting regions of positive and negative vorticity $\omega$, in accordance with the mechanism illustrated in FIG. 4.

FIG. 4 is a view looking downstream in the flow along the plate 100 in FIGS. 3(a) and 3(b). (That is, a cross-section of the flow in the spanwise (z) direction.) As a result of the introduction of the electrolyte 130, the fluid has a higher conductivity $\sigma_1$ in the near-wall region than the conductivity $\sigma_2$ in regions outside the near-wall region. As those skilled in this art know, the "near-wall" region is that part of the flow in the boundary layer responsible for most of the turbulence production. In the near-wall region, viscous forces predominate over momentum forces.

Figure 5:
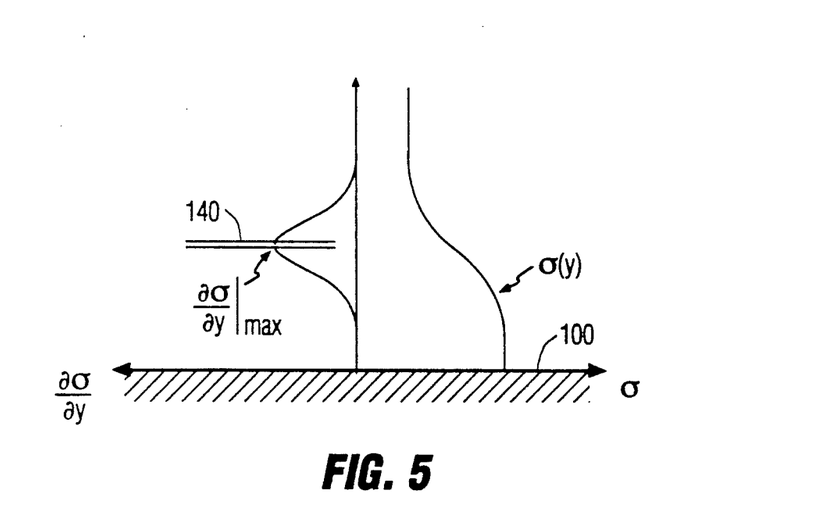
FIG. 5 is a qualitative plot relating to the conductivity of the fluid flow shown in FIGS. 3(a) and 3(b)

The double line 140 denotes where the gradient of the conductivity $\sigma$ in the y-direction is at a maximum in the near-wall region. Optimally, the conditions under which the electrolyte 130 is introduced into the fluid flow are controlled so that the conductivity gradient is at a maximum at a predetermined distance from the wall, in accordance with principles discussed below. In FIG. 5, the right side qualitatively illustrates the conductivity variation in the y direction (y=0 at the surface of plate 100) and the left side plots the conductivity gradient for the conductivity illustrated on the right-hand side. The double line 140 is drawn in FIG. 4 at the distance from the wall where the conductivity gradient is at a maximum, as shown in FIG. 5.

This distance is typically between 10 and 30 wall units (y+), that is, $10 < y^+ > 30$, although it can vary depending on the properties of a particular fluid flow. A "wall unit" is a dimensionless number, usually expressed as y+, used by those skilled in the art to express distance when phenomena being measured relate to the flow conditions along a surface. In particular, the vertical distance from the wall of a flat plate may be expressed as:

$$y^+ = y \frac{u_\tau}{\nu} \qquad (3)$$

where $\nu$ is the kinematic viscosity of the fluid and $U_{96} = \sqrt{\tau_2/\rho}$, $\tau_W$ being wall shear stress (see Equation 1) and $\rho$ being the density of the fluid.

Referring back to FIG. 4, turbulence in a boundary layer is generally associated with regions of positive and negative vorticity $+\omega$ and $-\omega$. As illustrated in FIG. 4 by the raised portion 141 of the double line, this vorticity is believed to be one of the mechanisms at work in the lift-up of near-wall low-momentum fluid and its replacement by higher momentum fluid from regions further from the wall, that is, the phenomenon explained previously in connection with FIGS. 2(a) to 2(c).

While the exact mechanism by which the present invention prevents this lift-up of a near-wall fluid is not completely understood, due to the as yet incomplete understanding of the feedback mechanisms that stimulate the creation of near-wall streamwise vorticity ($+\omega$ and $-\omega$), FIG. 4 illustrates one of the mechanisms believed to be at work. Since the boundary between the low- and high-conductivity fluid is displaced, as seen by the raised portion 141 of the double line in FIG. 4, the Lorentz force $L_y$ superimposed on the flow exhibits a gradient in the areas where that boundary is dislocated.

At the dislocation 141a on the left-hand side, $L_y$ is decreasing in the z-direction, to create streamwise vorticity $\omega_a$ in the positive direction that counteracts the vorticity $-\omega$ that caused the dislocation 141a in the boundary layer. At the right-hand dislocation 141b, $L_y$ is increasing in the z-direction, thus creating streamwise vorticity $\omega_b$ in a negative direction that counteracts the $+\omega$ at that location. The bolder vector for $L_y$ in FIG. 4 indicates a stronger force. Thus, since $L_y$ (which is negative because it is directed in the minus y-direction) becomes larger in the z-direction for the left-hand dislocation 141a, and smaller in the z-direction for the right-hand dislocation 141b, it creates vorticities in the opposite directions from $-\omega$ and $+\omega$, respectively.

The gradient of $L_y$ in the z-direction creates the counteracting vorticities because the near-wall region conductivity $\rho_1$ is higher than the more remote conductivity $\rho_2$, and the higher conductivity fluid carries more current. Accordingly, $L_y$ where there is more such fluid, such as where the boundary layer has been lifted up, is larger than in the adjacent areas.

FIG. 4 illustrates how the present invention is believed to counteract flow disturbances in the spanwise (z) direction. It is believed that the invention counteracts disturbances in the streamwise (x) direction in the same manner. That is, a schematic cross-section of the flow taken in the streamwise (x) direction instead of the spanwise (z) direction would look much the same as FIG. 4.

It is preferable that the conductivity gradient be a maximum at the edge of the near-wall region. However, that is not necessary. It is believed to be sufficient simply to have a conductivity gradient in the y-direction in the near-wall region in order to generate the $L_y$ gradients that create vorticity. That is, if $\delta$ is the height of the near wall region, then there should be a conductivity gradient in the y-direction between $y=0$ and $y=\delta$, with the maximum gradient preferably being at $y=\delta$.

It will be appreciated that by reversing the polarity of either the magnetic field or the electric current density, the force $\bar{J} \times \bar{B}$ can be provided in a direction normal to but directed away from the wall 100, which will result in the flow medium being pushed in a direction away from the wall surface 104. This effect can be used to disturb and destabilize the boundary layer by creating the dislocating vortices $-\omega$ and $+\omega$.

In the embodiment illustrated in FIG. 3, the current density and the magnetic field are normal to each other. This of course provides a maximum force $\bar{J} \times \bar{B}$ for given magnetic flux density $\bar{B}$ and current density J. However, it will also be appreciated that the electric current density and the magnetic field need not be perpendicular to each other as shown in these FIGURES. Any arrangement which provides a current and magnetic field traversing each other will result in a force $\bar{J} \times \bar{B}$.

It is also possible to provide any desired number of units modeled in the one shown in FIG. 3 so that an area of a surface incorporates as many discrete control regions as desired. Those discrete control regions can then be activated as needed to provide the desired control functions.

Arrangements besides that depicted in FIG. 3 are also possible in accordance with the present invention. For example, the electrodes could be arranged so that the current flows across the mean fluid flow direction while the magnetic flux lines are along the flow direction. Or the amount of current density and strength of the magnetic field can be varied with time to change that force.

In one of its most general aspects, the present invention provides for varying the magnetic field and current density over the entire control region and with time to provide boundary layer control effects precisely tailored to any particular flow condition. That is, the magnetic field can be expressed as a function $\bar{B}(x,y,z,t)$ and the current density can be expressed as a function $\bar{J}(x,y,z,t)$, so that the resulting force $\bar{L}=\bar{J} \times \bar{B}$ is a function $\bar{L}(x,y,z,t)$. Accordingly, to provide the desired control of the flow around an object it is possible to provide $\bar{B}(x,y,z,t)$ and $\bar{J}(x,y,z,t)$ that will provide the desired flow effects.

Although it may be possible under some circumstances to provide functions $\bar{B}(x,y,z,t)$ and $\bar{J}(x,y,z,t)$ that will produce the proper $L_y$ variations (see FIG. 4), a considerably more expedient manner of producing those variations is by providing a layer of different, preferably higher, conductivity fluid in the near-wall region. Accordingly, another of the general aspects of the present invention involves the provision of such a layer. In such a case, $\bar{B}$ and $\bar{J}$ need not be varied to produce the $L_y$ variations necessary for boundary layer control, although for given desired flow effects $\bar{B}$ and $\bar{J}$ may still be varied spatially and temporally.

The present invention has numerous significant implications. It can reduce viscous drag by stabilizing the boundary layer and preventing transition to turbulent flow. In addition, it can inhibit velocity fluctuations in the near-wall region over a wide area of a flow surface and thereby damp and dissipate velocity fluctuations in the free-stream flow. This can significantly affect the acoustic field in the fluid surrounding the body. And by stabilizing the boundary layer and preventing transition to turbulent flow, the present invention can reduce heat transfer between the fluid and the body, which is of great potential significance in reducing the temperatures to which space vehicles are subjected upon re-entry into the Earth's atmosphere.

On the other hand, providing $\bar{J} \times \bar{B}$ directed away from the body can destabilize the flow in the boundary layer and induce transition to turbulent flow. In that manner, heat transfer between the fluid and the body can be enhanced, which is important in applications such as heat exchanger design. Moreover, turbulent boundary layer flow enhances fluid mixing, which can have important ramifications in combustion and chemical processing applications (where two fluids may flow along opposite surfaces of a body to be mixed at the body's trailing edge). And a turbulent boundary layer is ordinarily less prone to separation than a laminar boundary layer, so that inducing turbulent boundary layer flow can delay separation.

Controlling boundary layer separation is, of course, important because of both the form (pressure) drag and the unstable pressure fluctuations associated with such a flow condition. Separation greatly increases the drag on the body due to the altered distribution of pressure when the flow separates. Accordingly, preventing separation reduces such drag. Separation can also create a fluctuating pressure field in the fluid that subjects the body to coupled forces which can cause fatigue. Delaying separation (by inducing turbulent boundary layer flow) or inhibiting separation (by providing a strong $\bar{J} \times \bar{B}$ force toward the body), can reduce these pressure fluctuations and the resulting fatigue.

By the same token, preventing or inducing separation under controlled conditions can be used to create forces and moments on the body and provide directional control.

The present invention has numerous potential applications. FIGS. 6 to 9 show some of them.

Figure 6:
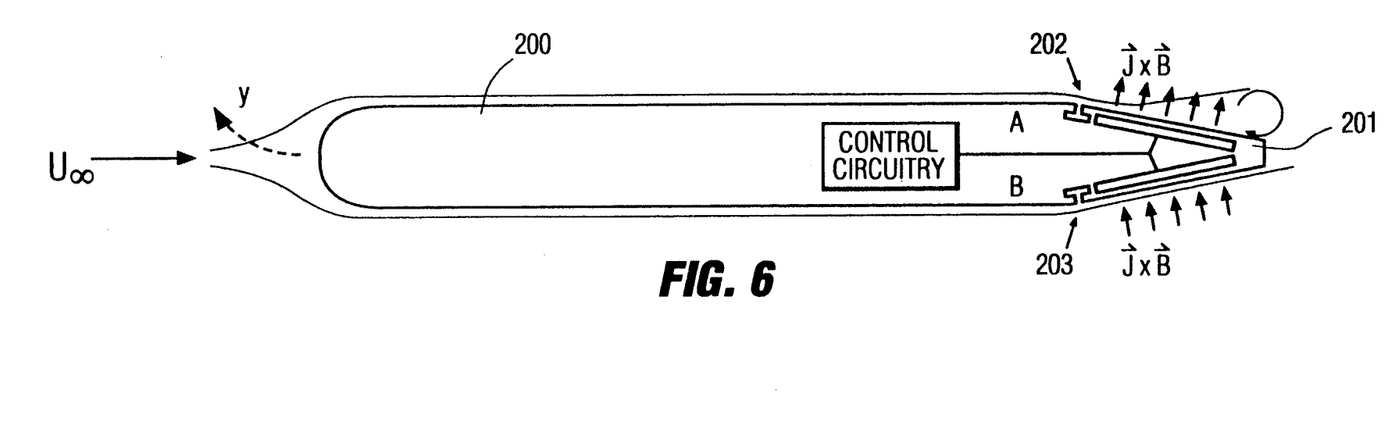
FIG. 6 depicts a cross-section of a torpedo incorporating the present invention.

In the embodiment depicted in FIG. 6, the surface on which it is desired to control the boundary layer is on the tail section 201 of a torpedo 200 or similar hydrodynamic or aerodynamic body. (The propulsive screw and stabilizing fins of the torpedo are omitted for clarity). Magnetic boundary layer control devices 202 and 203 in accordance with the present invention are provided for magnetically controlling the boundary layer over sections of the tail portion of the torpedo for steering the torpedo. By providing such control surfaces, remote control of the torpedo is possible.

In the example shown in FIG. 6, boundary layer control device 202 has been set such that the polarity of the electric current and magnetic fields are arranged to cause the $\bar{J} \times \bar{B}$ force to be in the direction normal to and away from the surface of the torpedo. This causes the boundary layer to be forced away from that surface thereby causing some separation, with a resulting increase in drag on that side of the torpedo. The resulting force on the torpedo (which can be provided in either the pitch or yaw direction, or both) induces a moment that can change the direction of the torpedo. If the direction of the $\bar{J} \times \bar{B}$ force provided by control device 203 is caused to act in a direction normal to and toward the surface, the fluid flows smoothly along the surface with no instability or increased drag on that side of the torpedo. Since side B of the tail section of the torpedo has a force distribution different from that on side A, the torpedo can be made to turn in the direction shown by the arrow y. Accordingly, remote directional control of the torpedo can by easily provided without the provision of moving control surfaces. Or, with a proper homing device, control circuitry can be included in the torpedo to modulate the $\bar{J} \times \bar{B}$ forces to direct the torpedo to its target automatically.

Figure 7:
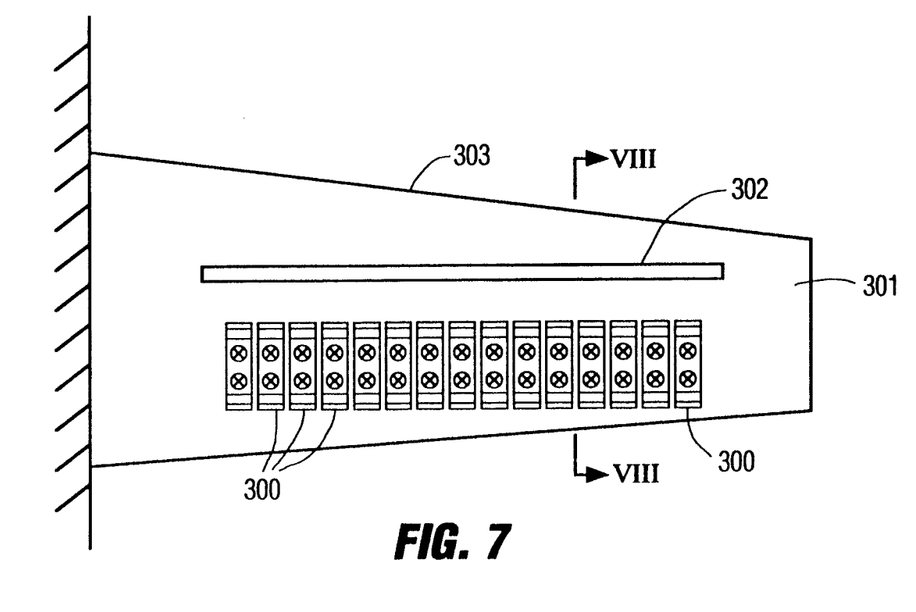
FIG. 7 depicts a planform of a wing incorporating the present invention.

In the embodiment depicted in FIG. 7, a series of boundary layer magnetic control modules 300 are provided within a wing 301. To provide a conductivity gradient in the near-wall region of the flow over this portion of the wing, a slit 302 is provided between the boundary layer control device 300 and the leading edge 303 of the wing to introduce a conductivity-enhancing material into the boundary layer. (It will be appreciated that the fluid around a space vehicle re-entering the Earth's atmosphere is essentially a plasma and thus inherently has a conductivity higher than that of air. The same phenomenon may be exhibited in other high-speed flight vehicles.)

Figure 8:
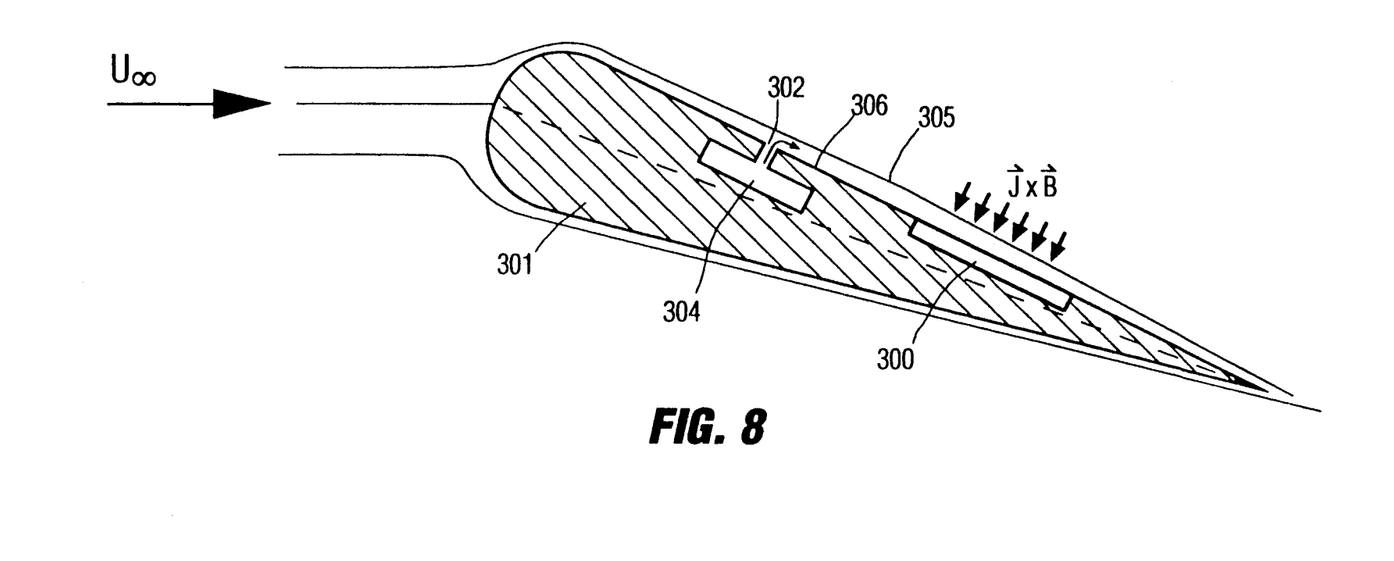
FIG. 8 is a cross-section along line VIII—VIII in FIG. 7.

As schematically depicted in FIG. 8, a reservoir 304 is provided within the wing for bleeding a conductivity-enhancing material into the near-wall region through a slit 302. This device could be a glow discharge device for charging Neon or other appropriate gas and injecting the gas into the near-wall region along the top surface of the wing, or a plasma generator for injecting a highly ionized gas into the near-wall region along the top surface of the wing. A conductivity gradient in the air in the near-wall region could also be provided by use of a laser device providing a high intensity thin sheet of energy for heating the near-wall flow of air to around several thousand degrees Celsius.

FIG. 8 illustrates that when the near-wall region has a high ion concentration, the boundary layer 305 can be stabilized by the $\bar{J} \times \bar{B}$ force directed toward the surface 306. Accordingly, the boundary layer will stay attached and not separate from the wing and the wing can operate at large angles of attack not previously possible. Or, alternatively, the $\bar{J} \times \bar{B}$ force could be directed outwardly from the wing surface to induce separation and thus increase drag for a braking effect.

Figure 9A:
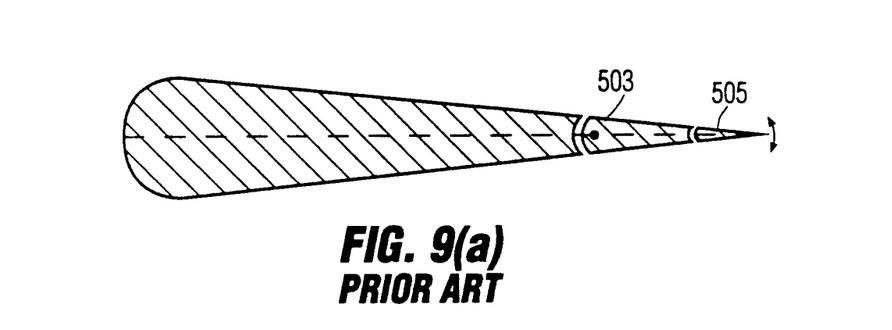
FIG. 9(a) depicts a transverse cross-section of a wing having a trim tab according to the prior art and FIG. 9(b) depicts the same wing with the trim tab replaced by an embodiment of the present invention.

In a typical wing arrangement show in FIG. 9(a), a trim tab 505 is provided at the trailing edge of aileron 503. The trim tab 505 is driven by a hydraulic screw or similar mechanical device for controlling the angle of the trim tab. In the embodiment of the present invention depicted in FIG. 9(b), magnetic turbulence control devices 501 and 502 according to the present invention are provided along the top and bottom surfaces, respectively, of the aileron 503. By controlling the characteristics of the boundary layer flowing over the aileron, the lift along that portion of the wing can be controlled and the wing can be easily and efficiently trimmed without the need for bulky and expensive mechanical devices.

Figure 9B:
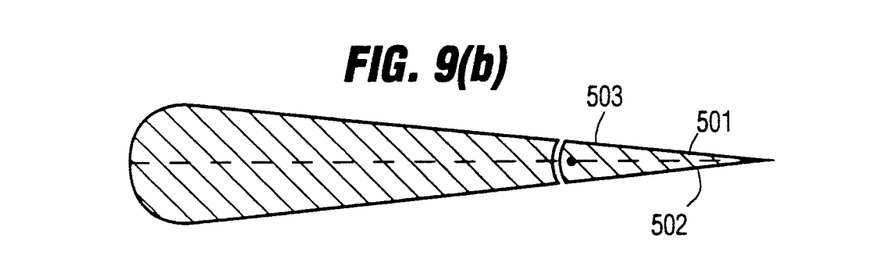

FIGS. 8 and 9 also demonstrate that it may be possible in some environments and geometries to eliminate completely other control surfaces such as aerilons and flaps. That is, by proper placement of control modules 300 an aircraft could conceivably be provided with directional control with fewer mechanical and hydraulic parts.

EXAMPLE

A test rig was set up to perform a feasibility study using the device shown in FIG. 3. The rig was tested in a flow channel in the test setup depicted in FIG. 10. The rig, shown in FIG. 10, consisted of a plate 609 about four meters long, having the components shown in FIG. 3 mounted thereon. The boundary layer control device 608 consisted of two permanent magnets 600 and 601, that provided a magnetic flux of approximately 600 gauss in the control region. Two magnets were used to extend the streamwise extent of the control region; in other words, the magnets 600 and 601 were arranged with their respective North and South poles adjacent to each other. Stainless steel (Type 304) electrodes 602 and 603 were provided approximately 15 cm. apart. They were approximately 1 cm. wide and 8 cm. long. A DC voltage of 5–50 volts was provided between the two electrodes, depending on the experiment, for generating a total current of 15 to 150 milliamps.

Figure 10:
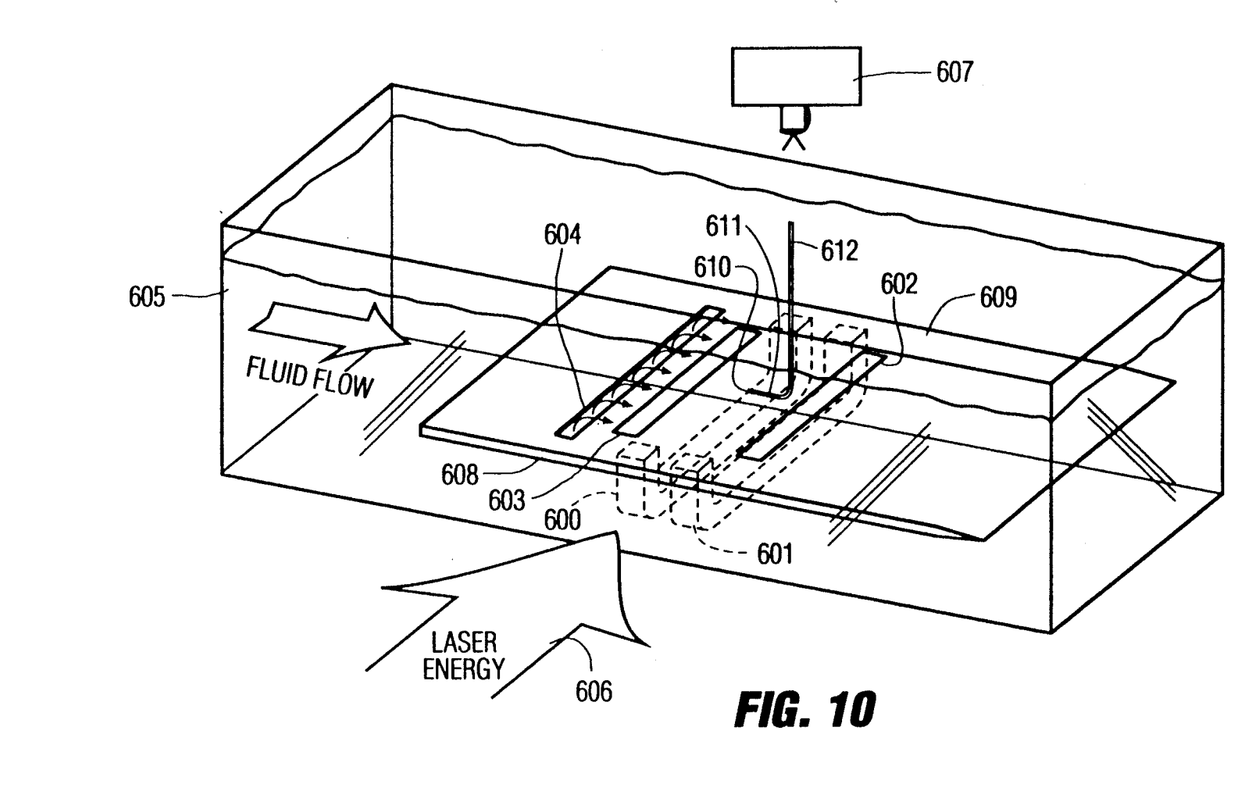
FIG. 10 shows a test setup used to demonstrate the efficacy of the embodiment of the invention shown in FIG. 3.

Various electrolytic substances were injected into the flow medium from a slot 604. The electrolytic substances consisted of dilute solutions of HCL, NaOH and NaCl, containing a fluorescing disodium fluoroscein dye to obtain flow visualization in a manner discussed below.

The test tank shown in FIG. 10 consisted of a tank approximately 1.5 meters wide, 0.5 meters high and six meters long. The test fluid 605 was set to flow at 15 cm/sec. A laser was arranged to provide a thin sheet of laser energy 606 along the boundary layer for activating the fluorescing dye in a thin layer along the surface of the plate to obtain visualization of the boundary layer. A video recorder 607 was provided for recording the results of the experiment.

In experiments performed on the test rig, a turbulent spot was produced upstream of the magnetic boundary layer control device 608 using a mechanical tripping device. It was observed that when the spot entered the control region of the device, turbulence in the boundary layer of plate 609 disappeared under various conditions, that is, using different electrolytes and different currents. The flow visualization techniques also confirmed qualitatively that reversing the flow of current increased the turbulence in the control region.

In addition to the qualitative indication, obtained by flow visualization, that the present invention stabilizes the boundary layer, quantitative measurements were also made. In these experiments a probe 610 was mounted on the end of a sting 611. The sting 611 was about 7 cm long and was secured to a strut 612 extending perpendicularly into the flow channel. The sting 611 extended parallel to the flow direction and was about 3 mm in diameter. The probe itself was a TSI Model 1210-20W cylindrical hot film velocity probe located in a central area of the control region at a distance of less than five wall units ($y^+ < 5$) away from the surface of the plate.

For $y^{30} < 5$, the streamwise velocity component ($u_x$) is linearly related to the distance from the wall. This can be appreciated from FIG. 2(a), where u(y) close to the wall approximates a straight line. Therefore, near the wall:

$$\tau_w = \mu \frac{du}{dy} \approx \frac{\Delta u}{\Delta y} \quad (4)$$

Accordingly, since $u_x = 0$ at the wall and $\Delta y$ is a constant, the changes in velocity measured by the probe reflect changes in wall shear stress and also in drag (see Equation 2).

Figure 11:
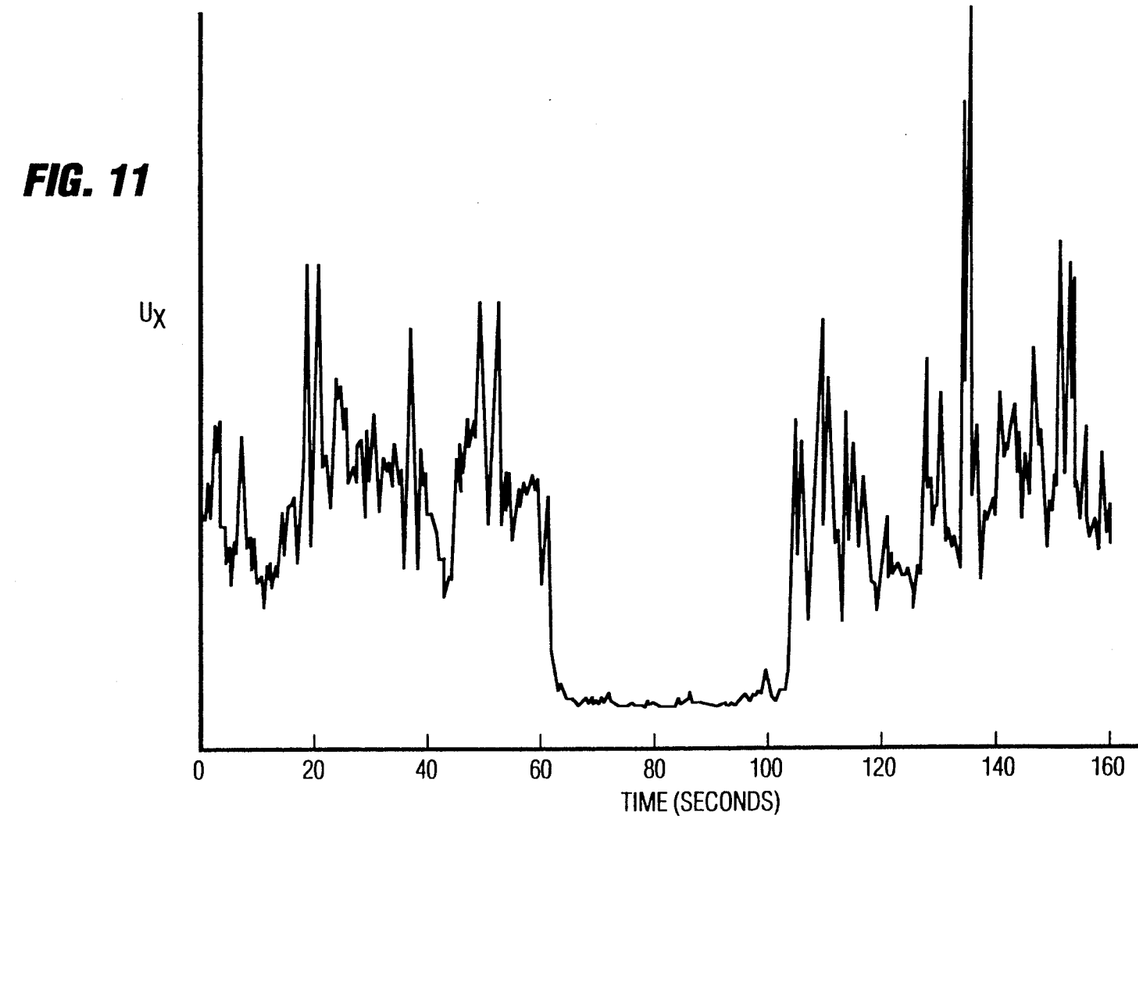
FIG. 11 shows test data generated by the test set-up shown in FIG. 10.

FIG. 11 plots the velocity measured by the probe during one experiment. A mechanical tripping device was used to trip the flow upstream of the control region. At $t = 0$ to $t = 60$, the control device of the present invention was not operating; that is, no current passed through the electrodes. At approximately $t = 60$ sec, a voltage of 30 volts was applied across the electrodes to induce a downward $\bar{J} \times \bar{B}$ force in the flow. FIG. 11 shows not only a significant decrease in the mean velocity in the control region, but an almost complete damping of velocity fluctuations, indicating a laminar boundary layer. Once the voltage was removed, at $t = 100$ seconds, the flow conditions reverted to their previous state.

It will be appreciated that magnetic boundary layer control devices such as discussed above could be provided on any surface upon which it is desired to control the boundary layer, either to prevent or cause separation, or to remove or induce instability.

The present invention provides a device that is simple to manufacture as discrete elements and which could be easily retrofit to craft presently in operation. Accordingly, the magnetic boundary layer control devices could be easily manufactured in large volume and delivered to a site of operation of the craft upon which it is to be installed. The devices could be easily fitted on the inside skin of the craft, for example on a submarine sail, with a minimum amount of time and effort.

Preliminary studies indicate that the power requirements for operational boundary layer control devices would be extremely low. In addition, with the breakthroughs presently taking place with superconductivity, it may be possible to significantly reduce the power requirements of devices incorporating the present invention by the use of superconducting electromagnets.

Of course, it will be appreciated that the invention may take forms other than those specifically described, and the scope of the invention is to be determined solely by the following claims.

What is claimed is:

1. An apparatus for controlling a boundary layer in a flow of a fluid having a predetermined electrical conductivity and moving relative to a surface, said apparatus comprising:
    conductivity altering means for providing an electrical conductivity gradient in a near-wall region of the flow proximate to the surface;
    magnetic field generating means for generating in the near-wall region of the flow a magnetic field $\bar{B}(x,y,z,t)$ having flux lines with a predetermined orientation with respect to the direction of relative movement of the fluid and the surface; and
    electric current generating means for generating in the near-wall region of the flow an electric current density $\bar{J}(x,y,z,t)$ traversing the magnetic flux lines,
    wherein said magnetic field generating means and said electric current generating means are disposed relative to each other such that the magnetic field $\bar{B}$ and the electric current density $\bar{J}$ create in the near-wall region of the flow a force $\bar{L}(x,y,z,t) = \bar{J} \times \bar{B}$ having a component normal to the surface for controlling the flow.

2. An apparatus according to claim 1, wherein the electric current density $\bar{J}$ is spatially constant and parallel to the surface in a mean-flow direction of the fluid.

3. An apparatus according to claim 2, wherein the magnetic field $\bar{B}$ is spatially constant and parallel to the surface transverse to the mean-flow direction of the fluid.

4. An apparatus according to claim 1, wherein the component of the force $\bar{J} \times \bar{B}$ normal to the surface is in a direction toward the surface for stabilizing the boundary layer.

5. An apparatus according to claim 4, wherein the force $\bar{J} \times \bar{B}$ reduces the shear stress in the fluid at the surface.

6. An apparatus according to claim 4, wherein the force $\bar{J} \times \bar{B}$ maintains attached flow over the surface.

7. An apparatus according to claim 1, wherein the component of the force $\bar{J} \times \bar{B}$ normal to the surface of the wall is in a direction away from the surface for destabilizing the boundary layer.

8. An apparatus according to claim 7, wherein the force $\bar{J} \times \bar{B}$ induces turbulent fluid flow in the boundary layer.

9. An apparatus according to claim 7, wherein the force $\bar{J} \times \bar{B}$ induces the boundary layer to separate from the surface.

10. An apparatus according to claim 1, wherein said magnetic field generating means and electric current generating means generate a magnetic field having flux lines perpendicular to the electric current.

11. An apparatus according to claim 1, wherein the surface comprises a lifting surface.

12. An apparatus according to claim 11, wherein said lifting surface is a control surface.

13. An apparatus according to claim 1, wherein the fluid is liquid and said conductivity altering means comprises means for bleeding an electrolyte into the boundary layer.

14. An apparatus according to claim 1, wherein the fluid is a gas and said conductivity altering means includes means for increasing the concentration of ions in the gas.

15. An apparatus according to claim 1, wherein said electric current generating means comprises a pair of electrodes disposed with the flux lines of the magnetic field between said electrodes.

16. An apparatus according to claim 1, wherein said magnetic field generating means comprises at least one permanent magnet.

17. An apparatus according to claim 1, wherein said magnetic field generating means comprises at least one electromagnet.

18. An apparatus according to claim 1, further comprising control means for varying at least one of the density and orientation of at least one of the magnetic field $\bar{B}$ and electric current density $\bar{J}$.

19. An apparatus for controlling a boundary layer in a flow of an electrically conductive fluid moving relative to a surface, said apparatus comprising:

magnetic field generating means for generating in the fluid a magnetic field $\overline{B}(x,y,z,t)$ having flux lines entering and leaving the surface; and electric current generating means for generating in the fluid an electric current density $\overline{J}(x,y,z,t)$ traversing the magnetic flux lines in the fluid, wherein said magnetic field generating means and said electric current generating means are disposed relative to each other such that the magnetic field $\overline{B}$ and the electric current density $\overline{J}$ create in the fluid a force $\overline{L}(x,y,z,t) = \overline{J} \times \overline{B}$ having a component normal to the surface for controlling the flow.

20. A device for travelling through a fluid medium having a predetermined conductivity, the device comprising:

a surface contacting the fluid medium so that a boundary layer is formed on said surface; and conductivity altering means for providing an electrical conductivity gradient in a near-wall region of the flow proximate to said surface;

flow control means including magnetic field generating means for generating in the near-wall region of the flow a magnetic field $\overline{B}(x,y,z,t)$ having flux lines with a predetermined orientation with respect to the flow over said surface and electric current generating means for generating in the near-wall region of the flow an electric current density $\overline{J}(x,y,z,t)$ traversing the magnetic flux lines, wherein said magnetic field generating means and said electric current generating means are disposed relative to each other such that the magnetic field $\overline{B}$ and the electric current density $\overline{J}$ create in the near-wall region a force $\overline{L}(x,y,z,t) = \overline{J} \times \overline{B}$ having a component normal to said surface for controlling the flow.

21. A device according to claim 20, wherein the surface is a lift-generating control surface and said device further comprises means for varying at least one of the density and orientation of at least one of the magnetic field $\overline{B}$ and the electric current density $\overline{J}$ to vary the lift generated by said control surface.

22. A device according to claim 21, wherein said lift-generating control surface is a surface on the wing of an airplane.

23. A method for controlling a boundary layer of a fluid moving relative to a surface and having an electrical conductivity gradient in a near-wall region of the flow proximate to the surface, said method comprising the steps of:

determining a magnetic field $\overline{B}(x,y,z,t)$ to be provided in the near-wall region of the flow by a magnetic field generator such that flux lines of the magnetic field have a predetermined orientation with respect to the direction of relative movement of the fluid and the surface;

determining an electric current density $\overline{J}(x,y,z,t)$ to be provided in the near-wall region of the flow by an electric current generator such that the electric current density traverses the magnetic flux lines in the fluid; and determining the relative positions at which the magnetic field $\overline{B}$ and the electric current density $\overline{J}$ are to be provided with respect to the surface and the meanflow direction of the fluid such that the magnetic field and the electric current to create in the fluid a force $\overline{L}(x,y,z,t) = \overline{J} \times \overline{B}$ having a component normal to the surface for controlling the flow.

24. A method according to claim 23, wherein the magnetic field $\overline{B}$ and the electric current density $\overline{J}$ are constant spatially.

25. A method for controlling a boundary layer of an electrically conductive fluid travelling along a surface, said method comprising the steps of:

determining a magnetic field $\overline{B}(x,y,z,t)$ to be provided in the fluid by a magnetic field generator such that flux lines of the magnetic field enter and leave the surface;

determining an electric current density $\overline{J}(x,y,z,t)$ to be provided in the fluid by an electric current generator such that the electric current density traverses the magnetic flux lines in the fluid; and determining the relative positions at which the magnetic field $\overline{B}$ and the electric current density $\overline{J}$ are to be provided with respect to the surface and the meanflow direction of the fluid such that the magnetic field and the electric current to create in the fluid a force $\overline{L}(x,y,z,t) = \overline{J} \times \overline{B}$ having a component normal to the surface for controlling the flow.

* * * * *

UNITED STATES PATENT AND TRADEMARK OFFICE
CERTIFICATE OF CORRECTION

PATENT NO. : 5,320,309
DATED : June 14, 1994
INVENTOR(S) : Daniel M. Nosenchuck, et al.

Page 1 of 2

It is certified that error appears in the above-identified patent and that said Letters Patent is hereby corrected as shown below:

ON TITLE PAGE

In [56] References Cited, under OTHER PUBLICATIONS:
For "Nosenchuck, D.M." (second occurrence):
"Laser," should read --Layer,--.

COLUMN 1

Line 41, "$U_{28}$," should read --$U_\infty$,--.

COLUMN 4

Line 21, "$U_{28}$." should read --$U_\infty$.--.

Line 26, "$\tau_w = \mu \frac{du}{dy}\big|_{wall}$  (1)"

should read --$\tau_w = \mu \overline{\frac{du}{dy}}\big|_{wall}$  (1)--.

COLUMN 6

Line 21, "$10<y^+>30$," should read --$10<y^+<30$,--.

Line 34, "$U_{96} = \sqrt{\tau_w/\rho}$," should read --$u_\tau = \sqrt{\tau_w/\rho}$,--.

COLUMN 7

Line 6, "$\rho_1$" should read --$\sigma_1$--.
Line 7, "$\rho_2$" should read --$\sigma_2$--.
Line 25, "near wall" should read --near-wall--.
Line 39, "$\overline{B}$" should read --B--.

UNITED STATES PATENT AND TRADEMARK OFFICE
CERTIFICATE OF CORRECTION

PATENT NO. : 5,320,309
DATED : June 14, 1994
INVENTOR(S) : DANIEL M. NOSENCHUCK, ET AL.

It is certified that error appears in the above-identified patent and that said Letters Patent is hereby corrected as shown below:

COLUMN 9

Line 24, "by" should read --be--.

COLUMN 10

Line 11, "aerilons" should read --ailerons--.
Line 30, "other" should read --other.--.

COLUMN 11

Line 6, "$y^{30}<5,$" should read --$y^+<5,$--.
Line 17, "drag" should read --viscous drag--.

COLUMN 14

Line 23, "meanflow" should read --mean-flow--.
Line 24, "to" should be deleted.
Line 44, "meanflow" should read --mean-flow--.
Line 45, "to" should be deleted.

Signed and Sealed this

Twenty-ninth Day of November, 1994

Attest:

BRUCE LEHMAN

Attesting Officer

Commissioner of Patents and Trademarks